Patented Feb. 9, 1954

2,668,801

UNITED STATES PATENT OFFICE 2,668,801

COATING COMPOSITION COMPRISING A VINYL CHLORIDE POLYMER DISPERSED IN A MIXTURE OF PLASTICIZER AND AN ALKYL ETHER OF A MONO- OR DI-ETHYLENE GLYCOL

Arthur Charles Schultz, Ross Township, Allegheny County, Pa., assignor to Stoner-Mudge, Inc., Pittsburgh, Pa., a corporation of Pennsylvania No Drawing. Application April 21, 1953, Serial No. 350,220

5 Claims. (Cl. 260—318)

This invention relates to improved solid polyvinyl resin coatings and liquid polyvinyl resin dispersion compositions, particularly for ultimate use in coating metal objects such as tools, pipe, tubing and wire used for electrical conductors and other purposes. This application is a continuation-in-part of my application Serial No. 164,035, filed May 24, 1950, and later abandoned.

An object of my invention is to provide a harder and more abrasion-resistant coating for wire, which I accomplish by using a lower proportion of chemical plasticizer in combination with the polyvinyl resin than has been possible heretofore in compositions of this type known to the art.

It is a further object of my invention to provide a coating composition which retains its fluid or liquid properties substantially unchanged on aging in the fluid state, so as to be readily applicable as a liquid coating to metal surfaces and to yield thereafter on baking, a hard, tough film of uniform thickness.

Polyvinyl resin coatings in which the resin is actually dissolved in suitable solvent mixtures of ketones, esters and aromatic hydrocarbons, are well known and are adaptable to a wide variety of coating applications. Typical of such solution-type coatings based primarily on film-forming thermoplastic polymers and copolymers of vinyl and vinylidene halides alone or conjointly with vinyl esters, are those described in U. S. Patents 2,224,944, 2,293,413, 2,299,433, 2,324,078 and 2,337,424, for example. The polyvinyl resins employed in such solution coatings are of sufficiently low molecular weight (10,000 to 45,000) and are consequently of sufficiently high solubility, to permit formulating into solutions of workable viscosity (50 to 1000 centipoises) at between 15 and 30 percent by weight of film-forming resin solids. However, such solutions have the disadvantage that from approximately 2 to 6 pounds of costly solvent are required for the application of 1 pound of vinyl resin. These lower molecular weight resins themselves have a certain deficiency as film-forming materials, in not possessing the toughness, ductility and tensile strength which characterize the higher molecular weight vinyl polymers and copolymers. These latter resins, however, do not lend themselves to the formulation of solution coatings, because of their very low solubility in ketone and ester solvents.

To circumvent this matter of low solubility and at the same time to obtain the desirable properties such as toughness, high resistance to tear, and high tensile strength which characterize films of vinyl polymer and copolymer resins having molecular weights ranging from about 45,000 up to or in excess of 160,000, recourse has been had to "dispersing" such normally insoluble resins (by grinding and similar means) in colloidal form in chemical plasticizers, so as to produce dispersions which are fluid or semi-fluid at room temperatures but which are capable of being converted into solid plastics or films by simply heating to the point of mutual solubility of the resin and plasticizer. These thermoplastic polyvinyl resin dispersions, which the art terms "plastisols," and of which the compositions disclosed in U. S. Patent 2,497,045 for example, are typical, are in general not applicable to specialized purposes such as the coating of wire and other metal objects where the finished coating must possess an extremely high degree of toughness, abrasion resistance and resistance to denting or marring. The non-applicability of plastisol films as they have had to be formulated before the present invention, results from the fact that so high a proportion of plasticizer to resin is required to provide a fluid or semi-fluid dispersion, that the final fused film is undesirably soft, rubbery, and seriously lacking in abrasion resistance. And this deficiency has materially limited the utility of the presently known plastisol coating compositions.

I have for convenience used the term "polyvinyl resin" to describe the essential film-forming ingredient of my coating compositions. This is a term familiar to the art; and it will be understood that I mean to include the solid thermoplastic polymers and copolymers derived from vinyl chloride and vinylidene chloride, alone or conjointly with a lower fatty acid ester of vinyl alcohol of which vinyl acetate is most commonly employed. In all of these, vinyl chloride is usually the predominating monomer, as is well known.

For example, the conventional two-component plastisols, consisting of a plasticizer and a polyvinyl resin, require the use of from 40 to 150 parts of plasticizer to each 100 parts of polyvinyl resin, the usual proportions ranging from 80 to 120 parts of plasticizer to 100 parts of resin. This high proportion of plasticizer is necessary in order to obtain, in the first place, proper mutual solvation of resin and plasticizer on heating to form a solid plastic, but more particularly in order to obtain in the fluid state viscosities sufficiently low to enable the liquid composition to be applied by dipping, spraying, knifing or other suitable means, onto the metal or other particular surfaces to be coated, unless resort be had to a third component which is a volatile diluent liquid, as I shall discuss later. Typical of such a desirably low plastisol viscosity, is that of a composition having 67 parts of plasticizer (dioctyl sebacate) to 100 parts of polyvinyl chloride resin (B. F. Goodrich Chemical Company's Geon 121) which has a viscosity when initially prepared of about 1000 centipoises. However, a heat-converted solid film of this composition has a Shore A durometer hardness value of only about 70, due to its high plasticizer content; it does not possess all of the properties required for specialized coating applications, particularly where a high degree of hardness and abrasion-resistance are needed as in electrical wire insulation. In such specialized application, hardness values of 85 to 98 durometer are much to be preferred, and may be absolutely mandatory.

To obtain solid films having hardness values approximating 85 durometer, it is necessary that not more than 43 to 45 parts of plasticizer to 100 parts of polyvinyl resin be employed. But such a two-component composition has a viscosity of approximately 13,000 centipoises and is therefore much too viscous to be applied in economical filmweights by available means of application.

Furthermore, to obtain plastisols films having hardness values in the order of 90 to 95 durometer (which is the optimum range for electrical wire insulation) it is necessary to employ still lower proportions of plasticizer, as will be evident by referring to Table I, from which it will be noted that to obtain a hardness value of 90 durometer requires the use of no more than about 30 parts of plasticizer to 100 parts of resin; while to obtain a hardness value of 95 durometer requires the use of no more than about 18 parts of plasticizer to 100 parts of resin. Table I lists the viscosities of plastisol compositions (a) to (f) inclusive and the hardness values of heat-solidified films of these same compositions, as I have determined them by experiment, where the proportions of plasticizer are varied from 122 down to 39 parts per 100 parts of resin. Also shown are the hardness values (in parentheses) of mixtures of the same resin and plasticizer after intimate mixing and careful heating, wherein the proportions of plasticizer are varied from 30 down to 12.3 parts per 100 parts of resin. However, such mixtures have only very limited utility since they are not fluid compositions nor even coherent pastes, but rather they are semi-powdery mixtures of resin particles incompletely wetted with plasticizer. The plastic masses resulting from the application of pressure to these powdery masses, in combination with heat, carefully controlled to avoid scorching, do have, however, desirable physical properties, such as high durometer hardness and abrasion resistance. And the manner in which such compositions can be obtained in fluid form instead of as semi-powdery and crumbly masses, so that they are suitable for commercial application to diverse surfaces such as those presented by plain or fabric covered wire to provide electrical insulating coatings, is a principal object of my invention, as will hereinafter be detailed.

TABLE I

*Two-component "Plastisol" compositions (employing Geon 121 resin and di-octyl sebacate)*

| Composition Number | (a) | (b) | (c) | (d) | (e) | (f) | (g) | (h) | (i) | (j) |
|---|---|---|---|---|---|---|---|---|---|---|
| Resin to Plasticizer Ratio | 45/55 | 50/50 | 60/40 | 65/35 | 70/30 | 72/28 | 71/23 | 79/21 | 85/15 | 89/11 |
| Parts of Plasticizer to 100 Parts Resin | 122 | 100 | 67 | 54 | 43 | 39 | 30 | 26 | 18.5 | 12.3 |
| Viscosity @ 80° F. (Brookfield #4 Spindle 30 R. P. M.) (Centipoises) | 300 | 500 | 1,000 | 3,000 | 13,500 | >100,000 | (1) | (1) | (1) | (1) |
| Hardness: Shore "A" Durometer | 50 | 60 | 70 | 77 | 85 | (87) | (91) | (92) | (95) | (98) |

[1] No fluid "plastisol" obtained; dry and powdery mass only.

To overcome the powdery characteristics of masses like those of compositions (g) to (j) inclusive shown in Table I, it has in the past been proposed to add as a third ingredient, a liquid diluent to convert such dry masses into fluid or semi-fluid form, suitable for application as coatings. For this purpose, such diluents have been employed as aliphatic and aromatic hydrocarbons, ketones such as diisobutyl ketone which have relatively little solvent action on the polyvinyl resin at room temperature, esters and ether-esters such as octyl acetate, Cellosolve acetate, and mixtures of such materials. Although these diluents may provide the necessary fluidity, they have the serious disadvantage for many applications, of evaporating from the wet and unfused coating before the resin and plasticizer have been intersolvated by heat, with the result that the coating becomes powdery on the surface, or that it develops cracks and fissures in the surface (commonly referred to as "mud-cracking"), which further baking alone will not correct; nor does the further application of heat produce a homogeneous film or heat-solidified coating free of these defects.

In general, the diluents commonly employed for this purpose have boiling points below 200° C. They are completely unsuitable as diluents in dispersions for such specialized applications as the coating of wire to provide electrical insulation, where relatively high temperatures of baking, such as 205° to 400° C., and relatively short times of baking such as 10 to 200 seconds are employed, because their rapid rate of evaporation from the surface of the still un-fused dispersion prevents the complete and uniform fusion of the resin and plasticizer. The resultant surface-powdering fouls the coating-thickness regulating-guides through which the dispersion-coated metal wire or fabric is passed prior to entering the baking oven, in commercial manufacturing processes.

Nor is a boiling point higher than 200° C. all that is necessary to characterize a diluent with satisfactory properties for my purposes. For example, some of the high boiling ketones, and ether-alcohols such as isophorone (B. P. 209° C.) and the phenyl ether of di-ethylene glycol (B. P. 245° C.) are not satisfactory diluents for these low-plasticizer content dispersons, because they exert a deleterious solvent action on the polyvinyl resin even at room temperatures, which results in undesirable thickening, and viscosities above the range desirable for automatic machine application. This solvent action may even cause gelling or premature solidification of the dispersion, thus completely destroying its utility as a coating composition.

Diverse other diluent liquids, regardless of their boiling point, may have other undesirable effects, such as preferentially wetting the resin particles in the dispersions and thus interfering with the proper intersolvation of resin and plasticizer when the coating is solidified by heat; or they may be of such a nature that they are held in the solidifying mass until a critical temperature is reached whereupon they are vaporized or released suddenly, causing the formation of blisters or "blow-holes."

I have discovered certain liquid substances which possess the required properties of a satisfactory diluent for polyvinyl resin-plasticizer dispersion compositions wherein the proportion of plasticizer to resin is at least 7 parts but not more than 43 parts of plasticizer per 100 parts of polyvinyl resin. These substances are (a) the alkyl ethers of diethylene glycol wherein the said alkyl radical contains at least 4 carbon atoms but not more than 10, and (b) the alkyl ethers of monoethylene glycol wherein the alkyl radical contains at least 4 carbon atoms but not more than 10. The butyl ethers of diethylene glycol are the present preferred diluents for the purpose of my invention, dibutyl ether of diethylene glycol (B. P. approx. 255° C.) being the first choice and monobutyl ether of diethylene glycol (B. P. approx. 230° C.) being the second (for reasons hereinafter explained in more detail). Other diluents for the purposes of my invention are, for example, n-hexyl ether of diethylene glycol (B. P. approx. 252° C.), 2-ethyl hexyl ether of diethylene glycol (B. P. at 23 mm. approx. 158° C.), octyl ether of ethylene glycol (B. P. approx. 224° C.).

The general formula for the diluents suitable for the purpose of my invention is:

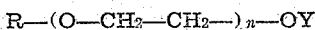

$$R-(O-CH_2-CH_2-)_n-OY$$

wherein $n$ is no more than 2, R is selected from the group consisting of those alkyl radicals possessing at least 4 but no more than 10 carbon atoms, and characterized by the fact that they have boiling points above at least 205° C. at atmospheric pressure, and Y is either hydrogen (as, for example, in the case of monobutyl ether of diethylene glycol) or is selected from the group from which R is selected (as, for example, in the case of dibutyl ether or diethylene glycol).

Differently phrased, my diluents are the alkyl ethers of mono and diethylene glycol in which the alkyl radical possesses at least 4 but no more than 10 carbon atoms, boiling above at least 205° C.

In the preferred three-component polyvinyl resin dispersions of my invention, the combined plasticizer and diluent comprises at least 33% but preferably not more than 40% of the total fluid dispersion (consisting of plasticizer, diluent and resin) in order to yield fluid compositions having initial viscosities below 3500 centipoises. These are suitable for application to surfaces such as metal wire and similar objects, and after heat-solidification with accompanying expulsion of the diluent which results from baking the applied coating at suitably high temperatures for the times required to drive out substantially all of the diluent, they yield plastic coverings having hardness values above about 85 durometer, as well as other desirable properties such as high abrasion resistance and resistance to marring and scuffing. At the same time they have excellent flexibility, toughness and film-continuity, and are free of bubbles, blisters, pits, dusting, cracking and other film defects. I have found that these desirable film properties can be obtained by baking the fluid polyvinyl resin dispersions of my invention at temperatures ranging from about 205° to 400° C., for times sufficient to expel the diluent, usually from about 10 to 200 seconds. In my fluid compositions I prefer that the proportion of combined diluent and plasticizer to resin should be at least 49 parts but preferably not more than 67 parts of diluent-plasticizer to 100 parts by weight of polyvinyl resin. Thus, the combined diluent and plasticizer constitute from 33 to 40 per cent by weight of the total dispersion.

In my preferred fluid compositions, I have established that the plasticizer should constitute at least 15% by weight of the plasticizer-diluent portion but that it should not exceed 85% of the plasticizer-diluent portion, by weight.

The following examples presented for convenience in Table II, employing a typical polyvinyl chloride resin ("Geon 121" made by B. F. Goodrich Chemical Company), a typical plasticizer (di-octyl sebacate) and a typical preferred diluent (monobutyl ether of diethylene glycol) illustrate the compositions of my invention. The viscosities of the fluid compositions are shown in centipoises as determined by the Brookfield viscosimeter, using a No. 4 spindle and a speed of 30 R. P. M. The hardness values, shown in Shore A durometer units, were determined on heat-solidified diluent-free films .005–.010 inch thick, obtained by baking the corresponding fluid compositions on metal at 205° C. for 180 seconds:

TABLE II

*Illustrative examples*

| Example No. | I | II | III | IV | V | VI |
|---|---|---|---|---|---|---|
| Resin (Parts by wt.) | 67 | 65 | 60 | 65 | 65 | 67 |
| Plasticizer (Parts by wt.) | 5 | 5 | 6 | 7 | 12 | 28 |
| Diluent (Parts by wt.) | 28 | 30 | 34 | 28 | 23 | 5 |
| Parts of Plast. to 100 Parts Resin | 7 | 7.7 | 10 | 10.8 | 18.5 | 43 |
| Total Parts of Plast. plus Dil. to 100 Parts Resin | 49 | 53.7 | 67 | 53.8 | 53.5 | 50.5 |
| Fluid Viscosity (Centipoises) | 1,400 | 600 | 300 | 960 | 960 | 2,130 |
| Durometer Hardness of Solid Film | 98 | 98 | 97 | 97 | 94 | 85 |

Although the foregoing examples show the use of a polyvinyl chloride resin (specifically, "Geon 121"), other similar polyvinyl resins may be equally successfully employed in the compositions of my invention. Typical are the polyvinyl resins known as the "Vinylite VYNV" series made by Union Carbide and Carbon Corporation, which are copolymers of vinyl chloride (at least 95% by weight) and vinyl acetate (no more than 5% by weight) and which have intrinsic viscosities in cyclohexanone @ 20° C. of 1.53 and specific gravities of about 1.39. Other resinous polymers and inter-polymers of vinyl chloride, vinylidene chloride, and vinyl esters, having substantially the same average molecular weights and intrinsic viscosities as the materials known as the "Vinylite VYNV" series, may be successfully employed either separately or in admixture with each other, as the resin component in the compositions of my invention.

Typical of such other satisfactory resinous materials is "Geon 202," a vinyl chloride-vinylidene chloride co-polymer made by B. F. Goodrich Chemical Company, having a specific gravity of 1.41 and a specific viscosity of 0.40 (0.4% solution in nitrobenzene at 20° C.). "Geon 121," used in the examples of Tables I and II, is a polyvinyl chloride resin, made by this same manufacturer; it has a specific gravity of 1.40 and a specific viscosity of 0.67 (0.4% solution in nitrobenzene at 20° C.).

Likewise, although the examples summarized in Table II show the use of dioctyl sebacate as the plasticizer component, a wide variety of other plasticizers commonly employed for plasticizing polyvinyl resin compositions may be used instead for the purposes of the invention. Typical are the alkyl and aryl derivatives of the fatty acids, the phthalates, pelargonates, glycolates, sebacates, adipates, azelates and phosphates, and petroleum oil fractions. I may use a single plasticizer or a mixture of several plasticizers specifically selected for special applications, based on such solid film requirements as low volatility, non-flammability, low temperature flexibility, non-tacky properties, absence of odor, non-migration, non-toxicity, and water insolubility.

The examples of Table II show the use of monobutyl ether of diethylene glycol as the diluent component, but other liquid diluents having boiling points above 205° C. and responsive to my generalized formula for my "diluent" also may be successfully employed. For example, dibutyl ether of ethylene glycol is interchangeable with monobutyl ether of diethylene glycol for the purposes of my invention except that the former, unlike the latter, is insoluble in water and hence does not tend to impair the electrical insulation qualities of a coating under wet conditions where relatively quick baking has left traces of the diluent in the final coating. And although I prefer to use the alkyl-ethers of ethylene glycol and diethylene glycol having boiling points at atmospheric pressure of at least 205° C. alone, I have also successfully employed combinations of these ether-alcohols with such other high boiling liquids as trimethyl nonanone and tetra-hydronaphthalene, in relatively minor amounts.

Although I have for convenience and simplicity described the compositions of my invention as "three-component", it should be understood that I am here referring to the three necessary and basic ingredients: resin, plasticizer and diluent. In addition to these three components, I may in specific cases employ other materials not affecting the invention; e. g., (1) dyes, pigments, fillers and colors to yield clear or opaque, white or colored baked out films; (2) thermal stabilizers such as the inorganic and organic compounds of lead and tin, as well as other materials to minimize or prevent thermal and actinic decomposition of the compositions on baking and exposure to light; and (3) waxes and oils to modify the surface characteristics of the baked compositions.

While I have described certain present preferred embodiments of the invention, it will be recognized that the invention is not limited thereto but may be otherwise variously embodied and practiced within the scope of the following claims.

I claim:

1. A fluid resin dispersion, capable of being spread upon a surface and thereafter fused by heating into a hard, stable, continuous, tough and abrasion-resistant coating, comprising resin, plasticizer and diluent, said resin, plasticizer and diluent consisting of (1) solid thermoplastic polyvinyl resin having an average molecular weight in excess of 45,000 and made from vinyl chloride in major amount, (2) plasticizer for the said resin, and (3) diluent selected from the group consisting of the alkyl ethers of mono and diethylene glycol in which the alkyl radical possesses at least 4 but no more than 10 carbon atoms and having a boiling point above at least 205° C., in which the combined weight of the said plasticizer and diluent is from 33 to 40 per cent of the combined weight of said resin, plasticizer and diluent, and wherein the weight of said diluent is 15 to 85 per cent of the combined weight of said diluent and plasticizer.

2. A fluid resin dispersion, capable of being spread upon a surface and thereafter fused by heating into a hard, stable, continuous, tough and abrasion-resistant coating, comprising resin, plasticizer and diluent, said resin, plasticizer and diluent consisting of (1) solid thermoplastic polyvinyl resin having an average molecular weight in excess of 45,000, having a specific gravity of 1.40 and a specific viscosity, at 0.4% solution in nitrobenzene at 20° C., of 0.67, and made from vinyl chloride in major amount, (2) plasticizer for the said resin, and (3) diluent selected from the group consisting of the alkyl ethers of mono and diethylene glycol in which the alkyl radical possesses at least 4 but no more than 10 carbon atoms and having a boiling point above at least 205° C., in which the combined weight of the said plasticizer and diluent is from 33 to 40 per cent of the combined weight of said resin, plasticizer and diluent, and wherein the weight of said diluent is 15 to 85 per cent of the combined weight of said diluent and plasticizer.

3. A fluid resin dispersion, capable of being spread upon a surface and thereafter fused by heating into a hard, stable, continuous, tough and abrasion-resistant coating, comprising resin, plasticizer and diluent, said resin, plasticizer and diluent consisting of (1) solid thermoplastic polyvinyl resin having an average molecular weight in excess of 45,000 and made from vinyl chloride in major amount, (2) plasticizer for the said resin, and (3) diluent selected from the group consisting of the butyl ethers of diethylene glycol, in which the combined weight of the said plasticizer and diluent is from 33 to 40 per cent of the combined weight of said resin, plasticizer and diluent, and wherein the weight of said diluent is 15 to 85 per cent of the combined weight of said diluent and plasticizer.

4. A fluid resin dispersion, capable of being spread upon a surface and thereafter fused by heating into a hard, stable, continuous, tough and abrasion-resistant coating having a Shore A durometer hardness of at least 85, comprising resin, plasticizer and diluent, said resin, plasticizer and diluent consisting of (1) solid thermoplastic polyvinyl resin having an average molecular weight in excess of 45,000, having a specific gravity of 1.40 and a specific viscosity, at 0.4% solution in nitrobenzene at 20° C., of 0.67, and made from vinyl chloride in major amount, (2) di-octyl sebacate as the plasticizer for the said resin, and (3) diluent selected from the group consisting of the butyl ethers of diethylene glycol, in which the combined weight of the said plasticizer and diluent is from 33 to 40 per cent of the combined weight of said resin, plasticizer and diluent, and wherein the weight of said diluent is 15 to 85 per cent of the combined weight of said diluent and plasticizer.

5. As a coating composition, a fluid resin dispersion, capable of being spread upon a surface and thereafter fused by heating into a hard, stable, continuous, tough and abrasion-resistant coating, in which the combined resin, plasticizer and diluent components consist of (1) 65 parts by weight of a polyvinyl chloride resin having an average molecular weight in excess of 45,000 further characterized by having a specific gravity of 1.40 and a specific viscosity, at 0.4 per cent solution in nitrobenzene at 20° C., of 0.67, (2) 12 parts by weight of di-octyl sebacate as the plasticizer ingredient, and (3) 23 parts by weight of diluent selected from the group consisting of the butyl ethers of diethylene glycol.

ARTHUR CHARLES SCHULTZ.

No references cited.